US009456380B2

(12) United States Patent
Stjernholm et al.

(10) Patent No.: US 9,456,380 B2
(45) Date of Patent: Sep. 27, 2016

(54) DATA COMPRESSION IN A COMMUNICATIONS NETWORK

(71) Applicant: TELEFONAKTIEBOLAGET L M ERICSSON (PUBL), Stockholm (SE)

(72) Inventors: Paul Stjernholm, Lidingo (SE); Hans Eriksson, Sollentuna (SE); Jens Knutsson, Enebyberg (SE); Fredrik Persson, Marsta (SE); Lars Westberg, Enkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 32 days.

(21) Appl. No.: 14/407,676

(22) PCT Filed: Jun. 13, 2013

(86) PCT No.: PCT/EP2013/062308
§ 371 (c)(1),
(2) Date: Dec. 12, 2014

(87) PCT Pub. No.: WO2013/186327
PCT Pub. Date: Dec. 19, 2013

(65) Prior Publication Data
US 2015/0124683 A1 May 7, 2015

Related U.S. Application Data

(60) Provisional application No. 61/659,130, filed on Jun. 13, 2012.

(51) Int. Cl.
H04W 28/06 (2009.01)
H04L 29/06 (2006.01)
(Continued)

(52) U.S. Cl.
CPC .......... *H04W 28/06* (2013.01); *H04L 12/1886* (2013.01); *H04L 67/2842* (2013.01);
(Continued)

(58) Field of Classification Search
CPC ... H04L 12/1886; H04L 69/04; H04L 29/06; H04W 28/06; H04W 4/18; H04W 8/02; H04W 28/0226; H04W 80/04
USPC .......................................... 370/312
See application file for complete search history.

(56) References Cited

U.S. PATENT DOCUMENTS 8,467,546 B2 * 6/2013 Hyatt .................. H04M 1/6008
381/100
9,066,354 B2 * 6/2015 Jin ...................... H04W 76/062
(Continued)

FOREIGN PATENT DOCUMENTS

WO    WO-02073810    9/2002

OTHER PUBLICATIONS

PCT Notification of Transmittal of the International Search Report and the Written Opinion of the International Searching Authority for PCT Counterpart Application No. PCT/EP2013/062308, (Sep. 24, 2013), 15 pages.
(Continued)

*Primary Examiner* — Afsar M Qureshi
(74) *Attorney, Agent, or Firm* — Patent Portfolio Builders, PLLC

(57) ABSTRACT

A method and apparatus for handling data compression in a mobile communication network. A node located between a mobile terminal and a mobility anchor point determines compression information relating to data transferred between the node and the mobile terminal. The node then sends the compression information to a network repository node for storage and retrieval by a further node in an event that subsequent mobility of the mobile terminal leads to transferring data between the mobile terminal and the further node.

24 Claims, 6 Drawing Sheets

(51) Int. Cl.
  *H04L 29/08* (2006.01)
  *H04L 12/18* (2006.01)
  *H04W 4/18* (2009.01)
  *H04W 8/02* (2009.01)
  *H04W 28/02* (2009.01)
  *H04W 80/04* (2009.01)

(52) U.S. Cl.
  CPC ............ *H04L69/04* (2013.01); *H04W 4/18* (2013.01); *H04W 8/02* (2013.01); *H04W 28/0226* (2013.01); *H04W 80/04* (2013.01)

(56) References Cited

U.S. PATENT DOCUMENTS

| 2006/0009150 | A1* | 1/2006 | Leung | H03M 7/3088 |
| | | | | 455/3.01 |
| 2007/0061546 | A1* | 3/2007 | Berger | H03M 7/30 |
| | | | | 711/202 |
| 2008/0115125 | A1* | 5/2008 | Stafford | H04L 69/04 |
| | | | | 718/1 |
| 2008/0120315 | A1 | 5/2008 | Ionescu et al. | |
| 2009/0063657 | A1 | 3/2009 | Samuels et al. | |
| 2011/0103703 | A1* | 5/2011 | Karlov | H03M 7/48 |
| | | | | 382/239 |
| 2014/0258652 | A1* | 9/2014 | Vishniac | G06F 3/0608 |
| | | | | 711/159 |

OTHER PUBLICATIONS

3GPP TS 23.060 V11.1.0, "General Packet Radio Service (GPRS); Service description Stage 2",3rd Generation Partnership Project; Technical Specification Group Services and System Aspects; (Release 11), http://www.3gpp.org/dynareport/23060.htm, (Mar. 9, 2012), 332 pages.

3GPP TS 23.401 V11.1.0 "General Packet Radio Service (GPRS) enhancements for Evolved Universal Terrestrial Radio Access Network (E-UTRAN) access" 3rd Generation Partnership Project; Technical Specification Group Services and System Aspects (Release 11), http://www.3gpp.org/ftp/Specs/html-info/23401.htm , (Mar. 2012), 284 pages.

* cited by examiner

DATA COMPRESSION IN A COMMUNICATIONS NETWORK

CROSS-REFERENCE TO RELATED APPLICATIONS

This application is a National stage of International Application No. PCT/EP2013/062308, filed Jun. 13, 2013, which claims priority to U.S. Application No. 61/659,130, filed Jun. 13, 2012, which are hereby incorporated by reference.

TECHNICAL FIELD

The invention relates to data compression in a communications network, and in particular to compression of data in a mobile communications network.

BACKGROUND

When sending data over a communications network, compression is a technique that is used to minimize the bandwidth required by that data in order to make the communications network more efficient. This is particularly important for communications networks that rely on wireless transmission of data. Wireless Area Network (WAN) acceleration/optimization of sending data relies on many different optimization techniques to reduce the bandwidth needed by services when sending data. This improves the Quality of Experience (QoE) for the end user.

Compressing the size of data content, using techniques such as de-duplication, may significantly reduce the bandwidth required, and solutions to do this are commercially available.

The process of de-duplication is illustrated in FIG. 1, in which a compressor 1 or a de-compressor 2 identifies byte patterns in a payload of a data stream and associates an identified byte pattern with a shorter index, referred to as a signature. This is done for many byte patterns, leading to many signatures, which are stored in a database. The data payload and the associated signatures are transmitted to the remote side, where the same association is stored in a database. This phase is denoted as the learning phase. At some point in time the de-compressor 2 agrees with the compressor 1 to start sending compressed data over the link. Alternatively, a signature can be assigned to a pattern of bytes as soon as the pattern is repeated. Subsequent byte patterns identified by the compressor 1 are replaced with the corresponding signatures, which are sent over the link. At the de-compressor 2, the signatures are again replaced with the full byte patterns. The original data stream is thus recreated and further processed as normal. Solutions are implemented in the network user plane and do not rely on the control plane.

A compressor 1 typically associates the signatures with a de-compressor 2. The correct signatures may therefore rely on knowledge of the identity of the de-compressor 2 (or compressor 1). It is possible that a compressor 1 may associate a signature with a particular byte pattern for sending the data associated with the byte pattern to a particular de-compressor 2, and associate a different signature to the same byte pattern for sending the data associated with the byte pattern to a different de-compressor.

Content compression and de-duplication is available between a server and one or more mobile clients targeting the enterprise scenario. However, if the server side is integrated in a mobile network node below a mobility anchor point, for example in a Serving Gateway (SGW), Serving GPRS Support Node (SGSN) or Radio Network Controller (RNC), then the compression and de-compression must take into account mobility of the mobile terminal. The network side needs to be able to compress data so that any mobile terminal may de-compress it, and be able to de-compress data from any mobile terminal. In this case, a mobile terminal may roam into a new cell handled by a different de-compressor, but the network side compressor may not have the identity of the different de-compressor.

FIG. 2 illustrates a network architecture intended for an enterprise scenario in which an endpoint (such as a central office) 3 connects to one or more branch offices, or an office connects to a mobile workforce 4, 5, 6. In this case, the office 3 side uses compression on the downlink and decompression on the uplink, and the mobile workforce side uses de-compression on the downlink and compression on the uplink.

Existing solutions for mobile clients 4, 5, 6 in an enterprise scenario cannot be directly deployed for a public scenario in a mobile network infrastructure if the downlink compression/uplink de-compression is deployed in a network node below the mobility anchor point, such as a PDN Gateway (PGW) 7 (or a GGSN), as shown in FIG. 3. The reason that existing solutions cannot be deployed in this type of architecture is that the identity of the de-compressor may change dynamically owing to mobile terminal mobility. In this example, a terminal 4 is connected to a source eNodeB 8 and a source SGW 9 but, because of mobility of the terminal 4, may subsequently connect to a target eNodeB 10 and a target SGW 11. The compressor at the office side needs to know which signatures can be used when compressing data towards a certain de-compressor. For example, if a mobile terminal is connected to a source SGW 9 in a Long Term Evolution (LTE) network, the compressor at the terminal 4 knows the identity of the de-compressor associated with the source SGW, and so can send compressed data using signatures. If the mobile terminal subsequently moves and connects to a new target SGW 11, the compressor must communicate with a new de-compressor.

Existing solutions to account for mobile terminal mobility are based on the de-compressor sending a notification to the compressor that it has received an unknown signature in a session. This will happen after handover of the mobile terminal, when the new de-compressor has not established a signature database with the compressor. The compressor then resets compression for that session and recommences the learning phase again. However, this approach result in the compression being less efficient since the learning phase can take around 2 hours to reach a compression efficiency of 80%.

Some solutions also deploy a handshake procedure between compressor and de-compressor to certify that compression is supported at both ends. However, this solution will induce some delay and data payload may need to be sent uncompressed until the de-compressor is identified.

SUMMARY

It is an object of the invention to address the problems caused by mobile terminal mobility when sending and receiving compressed data. Furthermore, it is an object of the invention to mitigate the problems associated with the relearning phase when an identity of a compressor or decompressor changes owing to mobility of a mobile terminal.

According to a first aspect, there is provided a method of handling data compression in a mobile communication network. A node located between a mobile terminal and a mobility anchor point determines compression information relating to data transferred between the node and the mobile terminal. It then sends the compression information to a network repository node for storage and retrieval by a further node in the event that subsequent mobility of the mobile terminal leads to transferring data between the mobile terminal and the further node. An example of the determination is the learning phase for allocating signatures to associated byte patterns. An advantage of sending compression information to a network repository is that if the mobile terminal subsequently attaches to the further node, the further node does not have to go through the learning process again, but can instead request the relevant compression information from the network repository.

As described above, an optional example of compression information is at least one byte pattern and a signature associated with the byte pattern.

The sent compression information optionally relates to any of the node and the mobile terminal.

As an option, the method further comprises receiving an unknown signature from the mobile terminal, determining that the unknown signature is not recognized, sending a request to the network repository node for a byte pattern associated with the unknown signature, and receiving from the network repository the byte pattern associated with the unknown signature.

As a further option, the node multicasts the compression information to a plurality of further nodes. An advantage of this is that other nodes (to which the mobile terminal may potentially move) are aware of the compression information.

The node optionally performs packet inspection prior to sending compression information towards the network repository node.

According to a second aspect, there is provided a method of handling data compression in a mobile communication network. A node receives from a network repository node compression information relating to a mobile terminal. The node then uses the received compression information to perform a compression operation on data sent to or from the mobile terminal. This ensures that when a mobile terminal attaches to a new node, the amount of learning required is limited because compression information such as signatures and associated byte patterns are already provided.

In an optional embodiment, the node is located between the mobile terminal and a mobility anchor point. In this case, the compression operation optionally comprises any of decompressing data received from the mobile terminal and compressing data prior to sending it towards the mobile terminal. As a further option, the method comprises, at the node, connecting to the mobile terminal as a result of mobility of the mobile terminal. The node optionally receives an unknown signature from the mobile terminal, determines that the unknown signature is not recognized, sends a request to the network repository node for a byte pattern associated with the unknown signature, and receiving from the network repository the byte pattern associated with the unknown signature. An advantage of this is that the node and the mobile terminal need not go through a learning phase to create a new signature for the byte pattern.

In a further optional embodiment, the node is the mobile terminal and the compression operation comprises any of decompressing data received from a remote node and compressing data prior to sending it to the remote node. An advantage of this is that the mobile terminal is informed of signatures used by, for example, a new node to which it has attached, thereby reducing the amount of learning required.

According to a third aspect, there is provided a node for use in a mobile communication network, the node being located between a mobile terminal and a mobility anchor point. The node is provided with a receiver for receiving compressed data from a mobile terminal, a database comprising compression information, a processor for using the compression information to decompress the compressed data, and a transmitter for sending the compression information towards a network repository node for storage and retrieval by a further node in the event that subsequent mobility of the mobile terminal leads to transferring data between the mobile terminal and the further node. The compression information optionally comprises at least one byte pattern and a signature associated with the byte pattern.

As an option, the processor is arranged to determine that required compression information is not stored at the database, and the node is further provided with a second transmitter for sending a request for compression information to the network repository node, a second receiver for receiving from the network repository node the requested compression information, and the processor is arranged to store the compression information at the database.

The processor is optionally arranged to perform packet inspection prior to sending compression information towards a network repository node.

According to a fourth aspect, there is provided a node for use in a mobile communication network. The node is provided with a processor for determining that mobility of a mobile terminal has resulted in a requirement to receive data from the mobile terminal. A receiver is provided for receiving compression information relating to the mobile terminal from a network repository. The processor is arranged to use the received compression information to decompress data received from the mobile terminal. As an option, the compression information comprises at least one byte pattern and a signature associated with the byte pattern.

According to a fifth aspect, there is provided a network repository node for use in a communication network: The network repository node is provided with a receiver for receiving compression information relating to data compression between a mobile terminal and a node located between the mobile terminal and a mobility anchor point. A computer readable medium in the form of a memory is provided for storing the received compression information in a database. A transmitter is also provided for sending the compression information to a further node subsequently located between the mobile terminal and the mobility anchor point.

According to a sixth aspect, there is provided a computer program comprising computer readable code which, when run on a network node, causes the network node to perform the method as described above in the first aspect.

According to a seventh aspect, there is provided a computer program comprising computer readable code which, when run on a network node causes the network node to perform the method as described above in the second aspect.

According to an eighth aspect, there is provided a computer program comprising computer readable code which, when run on a network node, causes the network node to behave as the network repository node described above in the fifth aspect.

According to a tenth aspect, there is provided a computer program product comprising a computer readable medium and a computer program as described above in any of the sixth, seventh or eighth aspects, wherein the computer program is stored on the computer readable medium.

According to an eleventh aspect, there is provided a method of handling data compression in a mobile communication network. A node located between a mobile terminal and a mobility anchor point determines compression information relating to data transferred between the node and the mobile terminal. It multicasts the compression information to a plurality of further network nodes for use by a further network node of the plurality of further network nodes in the event that subsequent mobility of the mobile terminal leads to transferring data between the mobile terminal and the further network node. For example, the determination of compression information may be a learning phase in which the node and the mobile terminal learn signatures and byte patterns associated with the signatures. Multicasting this information to further network nodes ensures that if mobility of the mobile terminal causes it to communicate with one of the further nodes, the further node does not need to repeat the learning process.

DETAILED DESCRIPTION

The following description is concerned with sending payload data in a communication network using compression methods such as de-duplication when one of the decompressor or compressors is deployed in a mobile terminal and when the remote side is deployed in the mobile network infrastructure below the mobility anchor point, such as a PDN Gateway or GGSN. Node in the network share compression information (examples of which are signatures and byte patterns). This decreases requirements on the compressor in the mobile terminal, as more compression operations can be performed in the network below the mobility anchor point. A central network repository may also be provided to allow fewer and shorter signatures, thereby increasing the overall compression gain.

While the bulk of the description below describes techniques in the context of a LTE network, it will be appreciated that the same techniques can be used to share compression information between nodes below a mobility anchor point in any type of mobile communications network. Furthermore, references to a mobile terminal include any equipment that can be used in a mobile network, such as a mobile phone, a smart phone, a laptop, a tablet device and so on.

Considering first the concept of the network side sharing compression information such as signatures and byte patterns, a new signature and its associated byte pattern are sent (for example, by multi-casting) to other de-compressors at other network nodes, where the receivers may be all other de-compressors in the network or only a subset thereof, such as adjacent de-compressors.

The compression information could be transferred by various means or a combination of various means. For example, compression information may be shared by using new inter-node control signaling messages. Alternatively (or additionally), compression information can be shared via RAN nodes using RAN Information Management (RIM) adding new Information Elements (IE), in a manner as described in 3GPP TS 23.060, General Packet Radio Service (GPRS); Service description; Stage 2. As an alternative or addition sharing mechanism, compression information can be shared over a mobile network intranet, where multi-cast techniques can be utilized.

Figure 1:
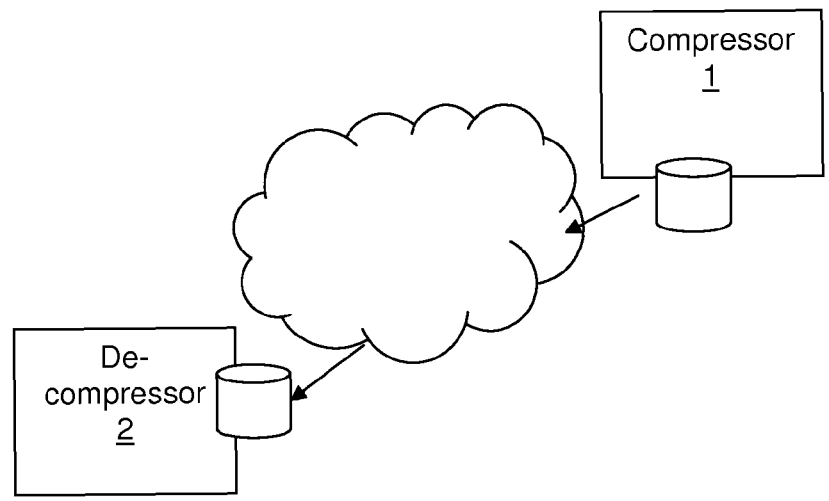
FIG. 1 illustrates schematically in a block diagram a network architecture and signaling for performing de-duplication when sending compressed data.
Figure 2:
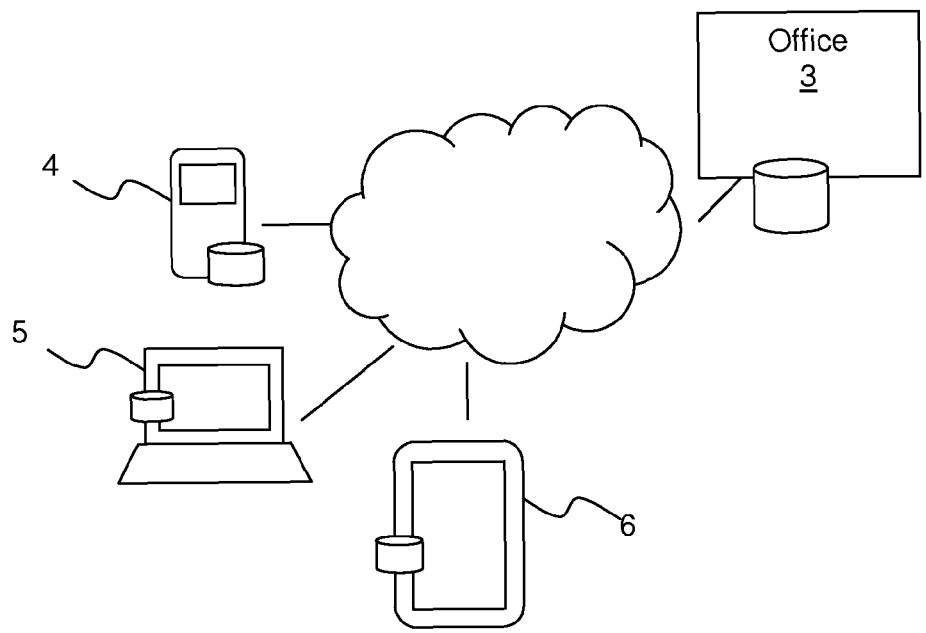
FIG. 2 illustrates schematically in a block diagram a network architecture and signaling for performing de-duplication when sending compressed data in an enterprise scenario.
Figure 3:
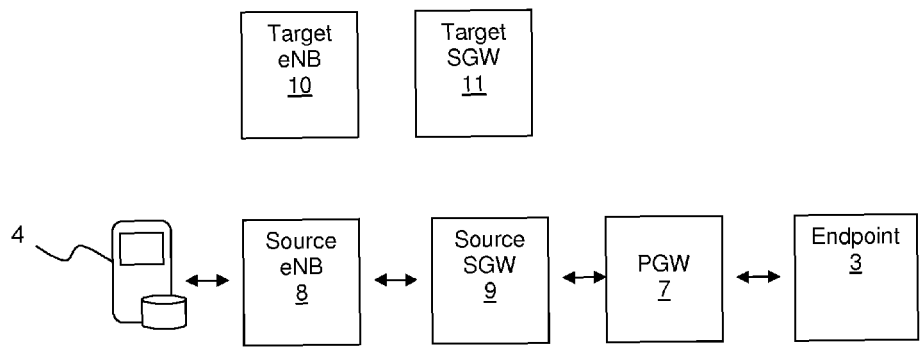
FIG. 3 illustrates schematically in a block diagram an exemplary LTE network architecture.
Figure 4:
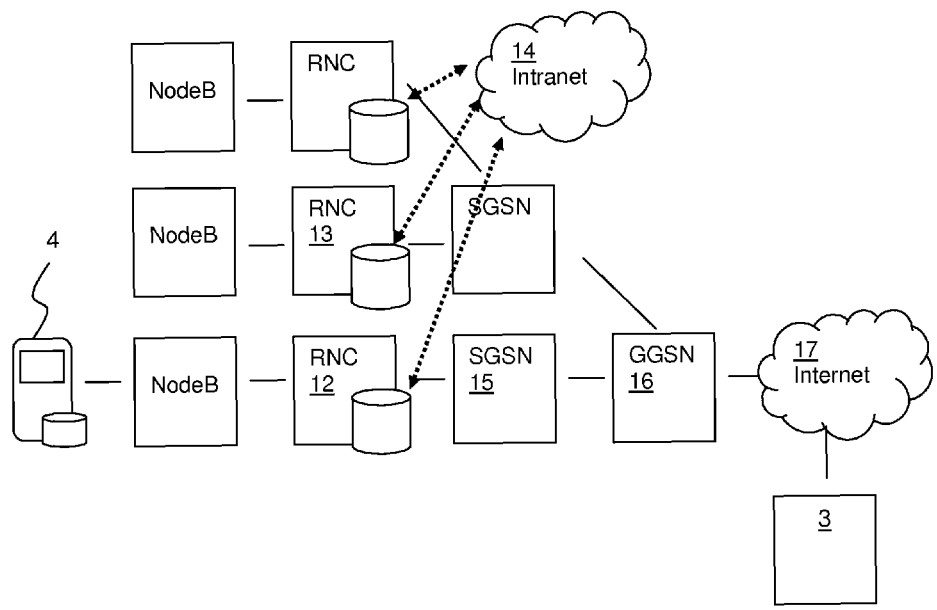
FIG. 4 illustrates schematically in a block diagram an exemplary network architecture and signaling for uplink de-compression databases using multicast transmission over an intranet.

FIG. 4 illustrates how new signatures and associated byte patterns learned are shared among the network de-compressors using multicast over the intranet of a Wideband Code Division Multiple Access (WCDMA) network. This may also be termed equalization of the de-compressor databases. FIG. 4 shows a mobile terminal 4, two RNCs 12, 13, an intranet network 14 in communication with the RNCs 12, 13, an SGSN 15, a GGSN 16, an Internet network 17 and an endpoint 3 sending (or receiving) compressed data.

In this instance, a de-compressor located at a RNC 13 serving a mobile terminal 4 goes through a learning phase with a compressor and builds up a database of compression information such as byte patterns and associate signatures. This compression information is multicast via an intranet 13 to other RNCs. If the mobile terminal 4 subsequently moves to another NodeB served by a different RNC 14, that RNC 14 uses the same byte patterns and signatures, and so there is no need for the decompressor at the new RNC 14 to go through a new learning phase with the compressor.

The mobile terminal 4 can compress data using the compression information (such as signatures) learned, without needing to take into account any association to a particular de-compressor at a particular RNC 12, 13. This simplifies the compression realization in the terminal. The solution increases the compression gain in the uplink of a mobile network by an increased probability of identified signatures.

Signatures need to be unique but may indentify duplicate byte patterns, i.e. byte patterns already known by the receiving de-compressor. In such cases storage could be optimized by the receiving party.

Figure 5:
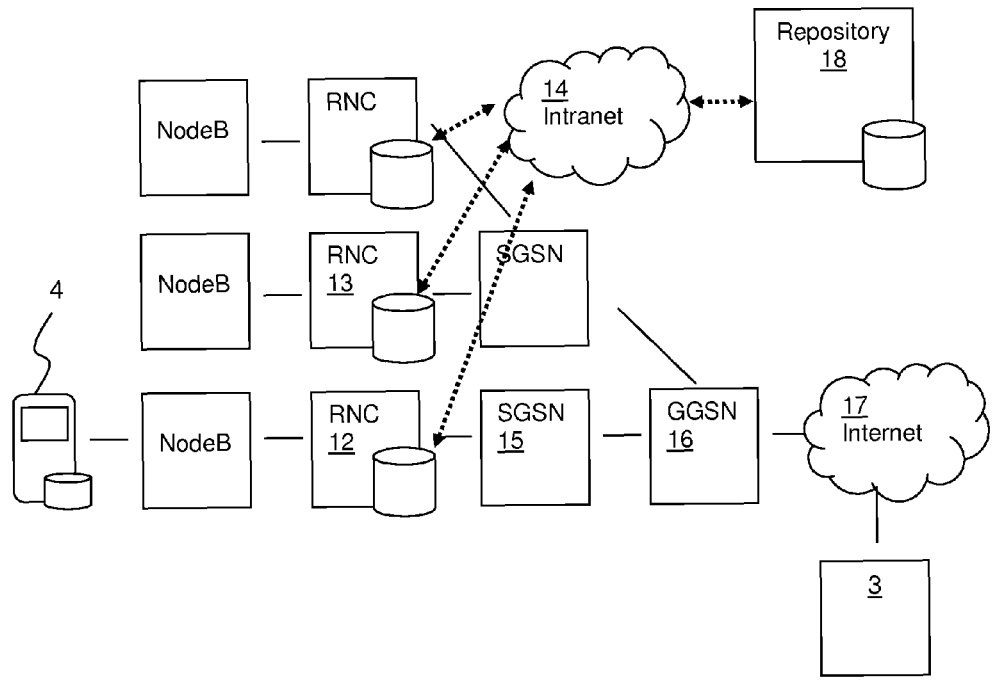
FIG. 5 illustrates schematically in a block diagram an exemplary network architecture and signaling in an embodiment in which a central network repository is provided.

By providing unique and shared signatures, the signatures can be made shorter and therefore provide an additional compression gain. This can be managed by providing a central network repository 18 of compression information such as byte patterns and signatures, as shown in FIG. 5. Network nodes can request unique signatures from the central network repository 18 by means such as:

1. the compressor or de-compressor requests signatures dynamically from the central network repository 18 when needed; or 2. the compressor or de-compressor pre-allocates one or more signatures, to be used when needed. More signatures are requested dynamically from the central network repository 18 when needed to refill local signature storage.

3. the compressor or de-compressor requesting a signature for an unknown byte pattern when needed from a central network repository 18.

FIG. 5 shows a central network repository accessible over the WCDMA mobile network intranet in a case where the de-compressor on the network side requests and assigns signatures.

Note that the concept of a central network repository 18, as shown in FIG. 5, can be used in addition to the concept of sharing compression information between network nodes as shown in FIG. 4. However, it will be appreciated that the concept of using a central network repository 18 may be used independently of the concept of sharing compression information between network nodes.

A central network repository for storing signatures and/or other compression information may located at nodes such as an Operation and Maintenance (OAM) node, or a central data storage node in the mobile network, or included in the storage of any ordinary network node, for example a shared storage in connection with a network controller such as an RNC.

Figure 6:
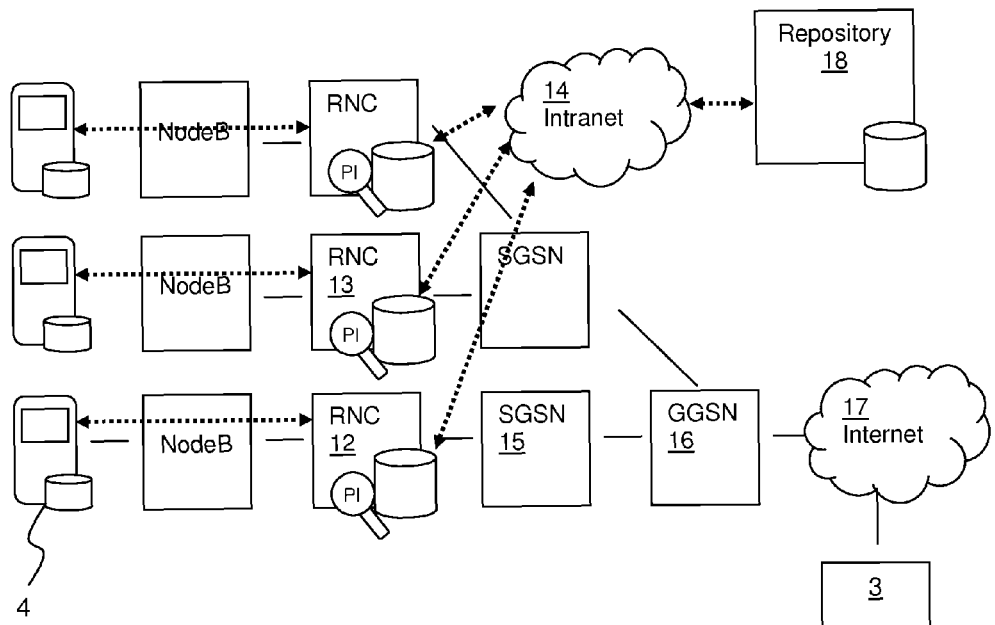
FIG. 6 illustrates schematically in a block diagram an exemplary network architecture and central network repository accessible from the terminal over the network intranet via traffic breakout using packet inspection in a network node.

FIG. 6 shows a central network repository 18 accessible over a WCDMA mobile network intranet in a case where the compressor in the mobile terminal 4 requests and assigns signatures. In this example, traffic to the central network repository is broken out using packet inspection (PI) in a node, in this example the RNC 14, and routed to the central network repository 18.

The above description concentrates on an uplink from the mobile terminal compressor to the decompressor below the mobility anchor point. A similar solution to equalize the compression information in all or a subset of the mobile terminals can be deployed to increase the downlink compression gain. However, there is a trade off between the compression gain and the extra transmission of signatures and bit patterns over the air interface that must be considered.

Figure 7:
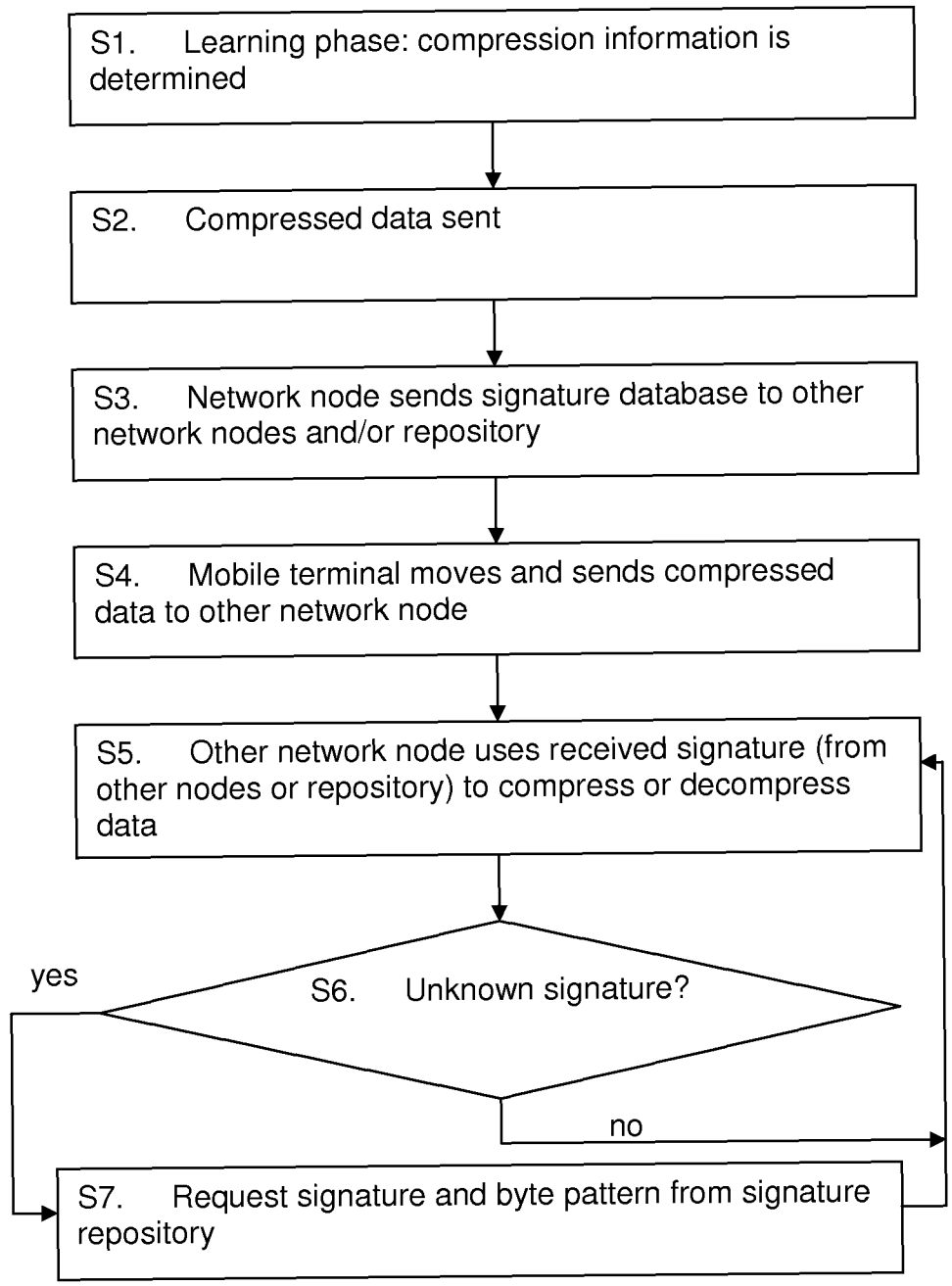
FIG. 7 is a flow diagram showing exemplary steps.

Turning to FIG. 7, a flow diagram showing the steps of an embodiment of the invention is shown. The following numbering corresponds to that of FIG. 7:

S1. In the learning phase, a node such as the mobile terminal 4 sends data to the network node (in this example, a RNC 12). The compressor at the mobile terminal 4 and/or the decompressor at the RNC 12 build up a database of signatures and byte patterns to allow the RNC 12 to determine compression information. Note that signatures may be requested and retrieved from the central network repository 18 in this phase. Note also that the learning may alternatively be offline and the central repository of signatures and byte patterns can be pre-provisioned with signatures and byte patterns via the OAM system.

S2. Compressed data is then sent in an uplink from the mobile terminal 4 to the RNC 12 using the signatures. The RNC 12 reconstructs the uncompressed data using the signatures and associated byte patterns (compression information).

S3. The RNC 12 sends the compression information to other network nodes (in this example, a further RNC 13). Furthermore, compression information may be cent to the central network repository 18.

S4. Mobility of the mobile terminal 4 results in the mobile terminal 4 sending data to the further RNC 13. Note that the term mobility is not limited to geographical mobility, but refers to the mobile terminal attaching to another node for any reason, such as geographical mobility or load balancing in the network.

S5. Because the further RNC 13 has received the compression information from the original RNC 12, it can immediately begin decompressing the received compressed data without having to repeat a learning phase with the compressor at the mobile terminal 4. Furthermore, it can begin compressing data to be sent towards the mobile terminal 4 without having to repeat a learning phase and establish new signatures associated with byte patterns with the mobile terminal.

S6. In an embodiment in which a central network repository of signatures and/or byte patterns is used, the different network node may receive an unknown signature. In this case the method continues at step S7, otherwise the different network node continues to receive compressed data as in step S5.

S7. In an optional embodiment, in the event that the different network node receives an unknown signature, it sends the unknown signature to a central network repository and receives the byte pattern associated with the signature in reply. This can be stored locally at the different network node, and used to decompress the compressed data.

FIG. 7 assumes that the compression information comprises a signature and associated byte pattern, but it will be appreciated that similar principles can be used for other types of compression information.

Figure 8:
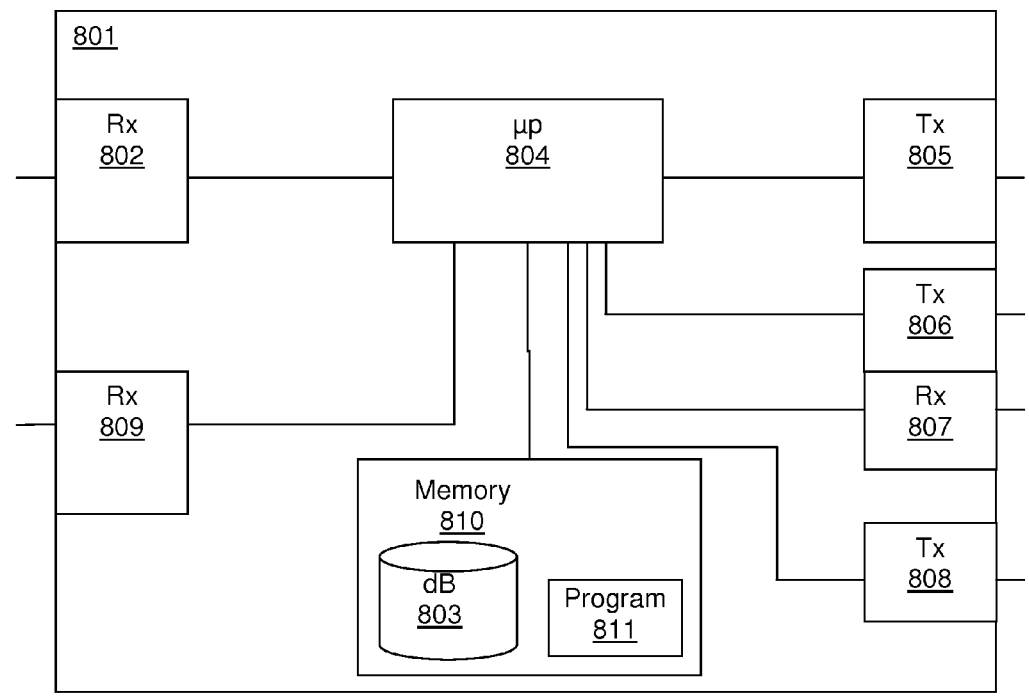
FIG. 8 illustrates schematically in a block diagram an exemplary network node.

FIG. 8 illustrates a network node as described above, such as an RNC 12 or SGSN 15. The network node 801 is provided with a first receiver 802 for receiving compressed data from the mobile terminal, and a database 803 containing compression information such as signatures and associated byte patterns. A processor 804 is provided for using the compression information to decompress the compressed data. A first transmitter 805 is provided for sending the compression information towards at least one further node. This can be used by the further node in the event that subsequent mobility of the mobile terminal leads to the mobile terminal sending compressed data towards the further node.

In an embodiment of the invention, a second transmitter 806 is provided for sending a request to a central network repository node in the event that a signature is not recognised. In this case, a second receiver 807 is provided for receiving from the central network repository node decompressed data associated with the compression information. The processor 804 is arranged to store the received decompressed data and the compression information at the database 803. A third transmitter 808 may also be provided for sending compression information to the central network repository node in order to provision the central network repository node.

In the event that the node does not undergo a learning phase with the mobile terminal, the node is provide with a receiver 809 for receiving compression information relating to data transferred between a further node and the mobile terminal. The processor 804 is arranged to determine that mobility of the mobile terminal has resulted in a requirement to receive data from the mobile terminal, in which case the processor 804 is arranged to use the received compression information to decompress data received from the mobile terminal.

The database 803 may be stored on a computer readable medium in the form of a memory 810. The memory 810 or another memory (not shown for clarity) may be used to store a program 811 which, when executed by the processor 804, causes the node to behave as described above.

Figure 9:
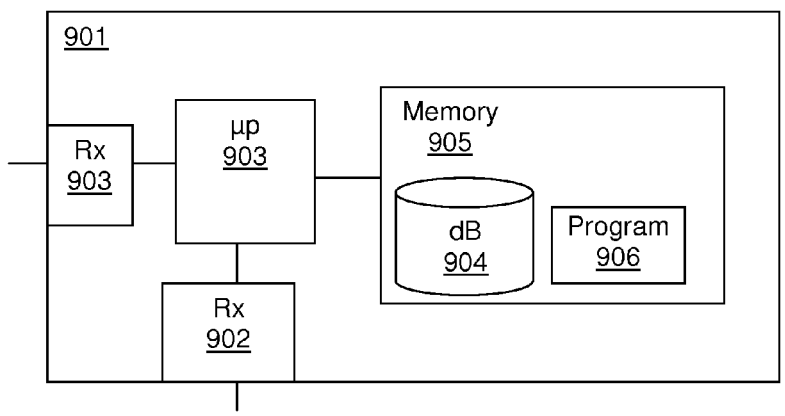
FIG. 9 illustrates schematically in a block diagram a further exemplary network node.

FIG. 9 shows a further network node 901, such as the further RNC 13 shown in FIGS. 4, 5, and 6. This node is not initially attached to the mobile terminal 4 but may subsequently receive data from the mobile terminal or an endpoint that requires a compression operation. The node 901 is provided with a receiver 902 for receiving from another node (such as the original RNC 12) compression information relating to a transfer of data between the mobile terminal 4 and the other node 12. As described above, the compression information may include signatures and byte patterns. A processor 903 is provided for storing the compression information associated with the mobile terminal 4 in a database 904 stored at a computer readable medium in the form of a memory 905. A second receiver 903 is provided for subsequently receiving data from the mobile terminal 4, whereupon the processor 903 can use the compression information stored in the database 904 and associated with the mobile terminal 4 to handle the data.

The memory 904 or another memory (not shown for clarity) may be used to store a program 906 which, when executed by the processor 903, causes the node 901 to behave as described above.

Figure 10:
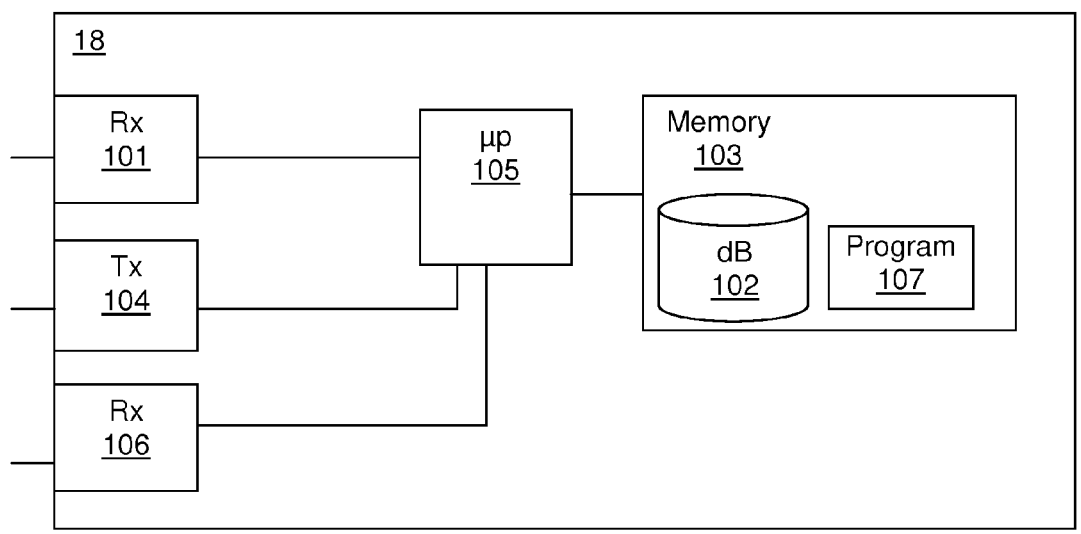
FIG. 10 illustrates schematically in a block diagram an exemplary central network repository for compression information.

Turning now to FIG. 10, there is shown a node 18 acting as a central network repository for compression information. The node 18 is provided with a first receiver 101 for receiving compression information relating to data compression between a mobile terminal and a node located between the mobile terminal and a mobility anchor point. As described above, one example of compression information that can be stored is a signature and corresponding byte string. A database 102 is used to store the compression information. The database is typically stored on a computer readable medium in the form of a memory 103. A transmitter 104 is provided for sending the compression information to a further node subsequently located between the mobile terminal and a mobility anchor point. A processor 105 is provided for controlling the node 18. A second receiver 106 may be provided for receiving requests for specific compression information.

The memory 103 or another memory (not shown for clarity) may be used to store a program 107 which, when executed by the processor 105, causes the node 18 to behave as described above.

The solution described above provides a way to account for mobile terminal mobility in the uplink, increasing the signature hit rate and thereby the uplink compression gain. It does not require the mobile terminal to be aware of the identity of the remote de-compressor to apply the proper signatures, thereby simplifying the realization of compression in the mobile terminal.

It will be appreciated by the person of skill in the art that various modifications may be made to the above described embodiment without departing from the scope of the present invention. For example, the functions of the network node are described as being embodied at a single node, but it will be appreciated that different functions may be provided at different network nodes. Furthermore, byte patterns and associated signatures are described as compression information in the above description, but it will be appreciated that compression information may relate to other compression techniques, such as data differencing. Finally, it will be appreciated that the techniques described above may be used in any type of network at nodes between a mobile terminal and a mobility anchor point.

The following acronyms have been used in the above description:
DL Downlink
eNodeB enhanced Node B
IE Information Elements
LTE Long Term Evolution
OAM Operation and Maintenance
PN Packet Data Network
PGW PDN Gateway
QoE Quality of Experience
RAN Radio Access Network
RIM RAN Information Management
RNC Radio Network Controller
SGW Serving Gateway
SGSN Serving GPRS Support Node
SI Signaling Information
SIB Signaling Information Block
TCP Transport Control Protocol
UL Uplink
WAN Wireless Area Network
WCDMA Wideband Code Division Multiple Access

The invention claimed is:

1. A method at a node located between a mobile terminal and a mobility anchor point for handling data compression in a mobile communication network, the method comprising:
   determining compression information relating to data transferred between the node and the mobile terminal;
   sending the compression information to a network repository node for storage and retrieval by a further node in an event that subsequent mobility of the mobile terminal leads to transferring data between the mobile terminal and the further node.

2. The method according to claim 1, wherein the compression information comprises at least one byte pattern and a signature associated with the byte pattern.

3. The method according to claim 2, wherein the sent compression information relates to any of the node and the mobile terminal.

4. The method according to claim 2, further comprising:
   receiving an unknown signature from the mobile terminal;
   determining that the unknown signature is not recognized;
   sending a request to the network repository node for a byte pattern associated with the unknown signature; and
   receiving from the network repository node the byte pattern associated with the unknown signature.

5. The method according to claim 1, further comprising multicasting the compression information to a plurality of further nodes.

6. The method according to claim 1, further comprising performing packet inspection prior to sending the compression information towards the network repository node.

7. A method at a node for handling data compression in a mobile communication network, the method comprising:
   receiving from a network repository node compression information relating to a mobile terminal; and
   using the received compression information to perform a compression operation on data sent to or from the mobile terminal.

8. The method according to claim 7, wherein the node is located between the mobile terminal and a mobility anchor point.

9. The method according to claim 8, wherein the compression operation comprises any of:
   decompressing data received from the mobile terminal; and compressing data prior to sending it towards the mobile terminal.

10. The method according to claim 7, further comprising connecting to the mobile terminal as a result of mobility of the mobile terminal.

11. The method according to claim 7, further comprising:
receiving an unknown signature from the mobile terminal;
determining that the unknown signature is not recognized;
sending a request to the network repository node for a byte pattern associated with the unknown signature; and
receiving from the network repository node the byte pattern associated with the unknown signature.

12. The method according to claim 7, wherein the node is the mobile terminal and the compression operation comprises any of decompressing data received from a remote node and compressing data prior to sending it to the remote node.

13. The method according to claim 7, wherein the compression information comprises any of a signature, and a signature and an associated byte pattern.

14. A node for use in a mobile communication network, the node being located between a mobile terminal and a mobility anchor point, the node comprising:
a receiver arranged to receive compressed data from the mobile terminal;
a database arranged to store compression information;
a processor arranged to use the compression information to decompress the compressed data;
a transmitter arranged to send the compression information towards a network repository node for storage, wherein the compression information is retrievable by a further node in an event that subsequent mobility of the mobile terminal leads to transferring data between the mobile terminal and the further node.

15. The node according to claim 14, wherein the compression information comprises at least one byte pattern and a signature associated with the byte pattern.

16. The node according to claim 14, wherein the processor is further arranged to determine that required compression information is not stored in the database, the node further comprising:
a second transmitter for sending a request for the compression information to the network repository node;
a second receiver for receiving from the network repository node the requested compression information,
wherein the processor is further arranged to store the compression information in the database.

17. The node according to claim 14, wherein the processor is further arranged to perform packet inspection prior to sending the compression information towards the network repository node.

18. A node for use in a mobile communication network, the node comprising:
a processor arranged to determine that mobility of a mobile terminal has resulted in a requirement to receive data from the mobile terminal;
a receiver for receiving from a network repository node compression information relating to the mobile terminal,
wherein the processor is further arranged to use the received compression information to decompress data received from the mobile terminal.

19. The node according to claim 18, wherein the compression information comprises at least one byte pattern and a signature associated with the byte pattern.

20. A network repository node for use in a communication network, the network repository node comprising:
a receiver for receiving compression information relating to data compression between a mobile terminal and a node located between the mobile terminal and a mobility anchor point;
a non-transitory computer readable medium in the form of a memory for storing the received compression information in a database; and
a transmitter for sending the compression information to a further node subsequently located between the mobile terminal and the mobility anchor point.

21. A non-transitory computer readable storage medium having computer code stored therein, which when executed by a processor of a network node located between a mobile terminal and a mobility anchor point for handling data compression in a mobile communication network, cause the network node to perform operations comprising:
determining compression information relating to data transferred between the network node and the mobile terminal; and
sending the compression information to a network repository node for storage and retrieval by a further node in an event that subsequent mobility of the mobile terminal leads to transferring data between the mobile terminal and the further node.

22. A non-transitory computer readable storage medium having computer code stored therein, which when executed by a processor of a network node for handling data compression in a mobile communication network, cause the network node to perform operations comprising:
receiving from a network repository node compression information relating to a mobile terminal; and
using the received compression information to perform a compression operation on data sent to or from the mobile terminal.

23. A non-transitory computer readable storage medium having computer code stored therein, which when executed by a processor of a network repository node for use in a mobile communication network, cause the network repository node to perform operations comprising:
receiving compression information relating to data compression between a mobile terminal and a node located between the mobile terminal and a mobility anchor point;
storing the received compression information in a database; and
sending the compression information to a further node subsequently located between the mobile terminal and the mobility anchor point.

24. A method at a node located between a mobile terminal and a mobility anchor point for handling data compression in a mobile communication network, the method comprising:
determining compression information relating to data transferred between the node and the mobile terminal; and
multicasting the compression information to a plurality of further network nodes for use by a further network node of the plurality of further network nodes in an event that subsequent mobility of the mobile terminal leads to transferring data between the mobile terminal and the further network node.

* * * * *